US009268846B2

(12) United States Patent
Liu et al.

(10) Patent No.: US 9,268,846 B2
(45) Date of Patent: Feb. 23, 2016

(54) SYSTEMS AND METHODS FOR PROGRAM IDENTIFICATION

(71) Applicant: Tencent Technology (Shenzhen) Company Limited, Shenzhen (CN)

(72) Inventors: Hailong Liu, Shenzhen (CN); Dadong Xie, Shenzhen (CN); Jie Hou, Shenzhen (CN); Bin Xiao, Shenzhen (CN); Xiao Liu, Shenzhen (CN); Bo Chen, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 62 days.

(21) Appl. No.: 14/161,765

(22) Filed: Jan. 23, 2014

(65) Prior Publication Data

US 2014/0343704 A1  Nov. 20, 2014

Related U.S. Application Data

(63) Continuation of application No. PCT/CN2013/086485, filed on Nov. 4, 2013.

(30) Foreign Application Priority Data

Apr. 28, 2013  (CN) .......................... 2013 1 0156479

(51) Int. Cl.
*G06F 17/00* (2006.01)
*G06F 17/30* (2006.01)

(52) U.S. Cl.
CPC .............................. *G06F 17/30743* (2013.01)

(58) Field of Classification Search
CPC .......... G06F 17/30743; G06F 17/3002; G06F 17/30784; G06F 17/30787; G10H 2240/135; G10H 2240/141; H04N 21/26603
See application file for complete search history.

(56) References Cited

U.S. PATENT DOCUMENTS

| 2003/0106413 | A1* | 6/2003 | Samadani et al. .............. 84/603 |
| 2006/0190450 | A1 | 8/2006 | Holm et al. |
| 2009/0043870 | A1* | 2/2009 | Ikezoye et al. ................ 709/219 |
| 2011/0113037 | A1 | 5/2011 | Wessling et al. |

(Continued)

FOREIGN PATENT DOCUMENTS

| CN | 101014953 A | 8/2007 |
| CN | 102799605 A | 11/2012 |

(Continued)

OTHER PUBLICATIONS

Chinese Patent Office, Office Action issued Mar. 2, 2015, in Application No. 201310156479.3.

(Continued)

*Primary Examiner* — Andrew C Flanders
(74) *Attorney, Agent, or Firm* — Jones Day

(57) ABSTRACT

Systems and methods are provided for program identification. For example, a first audio fingerprint corresponding to a first audio signal is acquired; whether one or more second audio fingerprints in a predetermined fingerprint database match with the first audio fingerprint is detected, a second audio fingerprint corresponding to a second audio signal; and in response to one of the second audio fingerprints matching with the first audio fingerprint, a program associated with the matching second audio signal is provided as a result for program identification associated with the first audio signal.

10 Claims, 10 Drawing Sheets

(56) References Cited

U.S. PATENT DOCUMENTS

2011/0173208 A1    7/2011  Vogel
2012/0245722 A1    9/2012  Yamamura
2014/0280265 A1*   9/2014  Wang .......................... 707/758

FOREIGN PATENT DOCUMENTS

CN          102833595  A    12/2012
CN          103021440  A    4/2013

OTHER PUBLICATIONS

Patent Cooperation Treaty, International Search Report, PCT/CN2013/086485, mailed Jan. 30, 2014.

Patent Cooperation Treaty, International Preliminary Report on Patentability, PCT/CN2013/086485, issued Nov. 3, 2015.

* cited by examiner

SYSTEMS AND METHODS FOR PROGRAM IDENTIFICATION

CROSS-REFERENCES TO RELATED APPLICATIONS

This application is a continuation of International Application No. PCT/CN2013/086485, with an international filing date of Nov. 4, 2013, now pending, which claims priority to Chinese Patent Application No. 201310156479.3, filed Apr. 28, 2013, both applications being incorporated by reference herein for all purposes.

BACKGROUND OF THE INVENTION

Certain embodiments of the present invention are directed to computer technology. More particularly, some embodiments of the invention provide systems and methods for network technology. Merely by way of example, some embodiments of the invention have been applied to data processing. But it would be recognized that the invention has a much broader range of applicability.

Television and radio remain the mainstream media-communication platforms in spite of the rapid development of the Internet, and users generally watch TV or listen to the radio to get information.

If a user unintentionally watches or listens to a section of a program, it is often needed to identify the program in order for the user to resume watching or listening to the program later. Conventionally, the user often acquires a keyword appeared in the program and manually enters the keyword through a keyboard or a touch screen. A terminal receives the keyword entered by the user, and sends the request for acquiring the program corresponding to the keyword to a server. The terminal then receives a program provided by the server in response to the user request, and provides the received program as a result for identifying programs associated with the keyword.

But the conventional technology has some problems. For example, the user may not be able to acquire the keyword or may acquire a wrong keyword, so that the terminal sends an incorrect program request based on the wrong keyword to the server. A correct program may not be acquired in response to the request, and thus the accuracy of program identification is reduced.

Hence it is highly desirable to improve the techniques for program identification.

BRIEF SUMMARY OF THE INVENTION

According to one embodiment, a method is provided for program identification. For example, a first audio fingerprint corresponding to a first audio signal is acquired; whether one or more second audio fingerprints in a predetermined fingerprint database match with the first audio fingerprint is detected, a second audio fingerprint corresponding to a second audio signal; and in response to one of the second audio fingerprints matching with the first audio fingerprint, a program associated with the matching second audio signal is provided as a result for program identification associated with the first audio signal.

According to another embodiment, an apparatus for program identification includes an acquisition module, a detection module, and an identification module. The acquisition module is configured to acquire a first audio fingerprint corresponding to a first audio signal. The detection module is configured to detect whether one or more second audio fingerprints in a predetermined fingerprint database match with the first audio fingerprint, a second audio fingerprint corresponding to a second audio signal. The identification module is configured to, in response to one of the second audio fingerprints matching with the first audio fingerprint, provide a program associated with the matching second audio signal as a result for program identification associated with the first audio signal.

According to yet another embodiment, a server comprises an apparatus for program identification. The apparatus includes: an acquisition module, a detection module, and an identification module. The acquisition module is configured to acquire a first audio fingerprint corresponding to a first audio signal. The detection module is configured to detect whether one or more second audio fingerprints in a predetermined fingerprint database match with the first audio fingerprint, a second audio fingerprint corresponding to a second audio signal. The identification module is configured to, in response to one of the second audio fingerprints matching with the first audio fingerprint, provide a program associated with the matching second audio signal as a result for program identification associated with the first audio signal.

According to yet another embodiment, a non-transitory computer readable storage medium comprises programming instructions for program identification. The programming instructions are configured to cause one or more data processors to execute certain operations. For example, a first audio fingerprint corresponding to a first audio signal is acquired; whether one or more second audio fingerprints in a predetermined fingerprint database match with the first audio fingerprint is detected, a second audio fingerprint corresponding to a second audio signal; and in response to one of the second audio fingerprints matching with the first audio fingerprint, a program associated with the matching second audio signal is provided as a result for program identification associated with the first audio signal.

For example, the systems and methods described herein are configured to improve the accuracy of program identification by solving the problem that users fails to acquire a program keyword or acquires a wrong program keyword and thus may not acquire a correct program. In another example, the systems and methods described herein are configured to improve the accuracy of program identification by reducing program-identification errors caused by a second audio fingerprint determined based on a matching degree from calculation errors.

Depending upon embodiment, one or more benefits are achieved. These benefits and various additional objects, features and advantages of the present invention are fully appreciated with reference to the detailed description and accompanying drawings that follow.

DETAILED DESCRIPTION OF THE INVENTION

Figure 1:
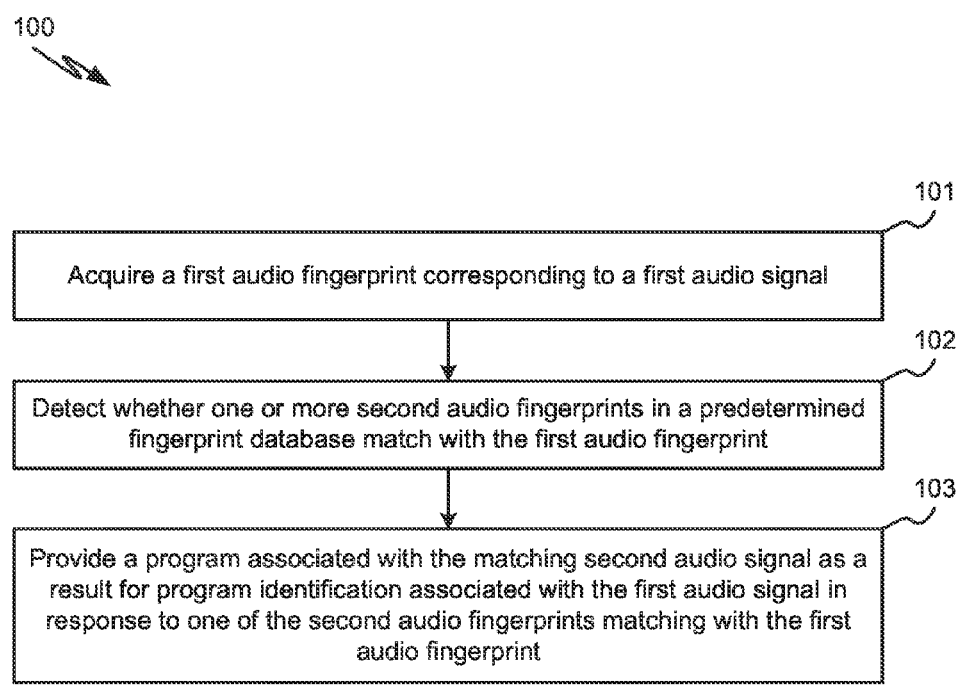
FIG. 1 is a simplified diagram showing a method for program identification according to one embodiment of the present invention.

FIG. 1 is a simplified diagram showing a method for program identification according to one embodiment of the present invention. This diagram is merely an example, which should not unduly limit the scope of the claims. One of ordinary skill in the art would recognize many variations, alternatives, and modifications. The method 100 includes at least the process 101 for acquiring a first audio fingerprint corresponding to a first audio signal, the process 102 for detecting whether one or more second audio fingerprints in a predetermined fingerprint database match with the first audio fingerprint, a second audio fingerprint corresponding to a second audio signal; and the process 103 for, in response to one of the second audio fingerprints matching with the first audio fingerprint, providing a program associated with the matching second audio signal as a result for program identification associated with the first audio signal.

According to one embodiment, during the process 101, a first audio fingerprint corresponding to a first audio signal is acquired. According to some embodiments, the program identification is performed according to the acquired first audio signal, where the first audio signal is acquired by a microphone. According to certain embodiments, the program identification is performed according to a video signal, and the video signal is acquired by a camera. In one embodiment, as the video signal includes a larger amount of data than the audio signal, using audio signals for program identification improves efficiency. For example, an audio fingerprint is an audio-content-based compact digital signature with a high compression ratio for representing one or more crucial acoustic characteristics, and the audio fingerprint is used to uniquely identify an audio signal.

According to another embodiment, during the process 102, whether one or more second audio fingerprints in a predetermined fingerprint database match with the first audio fingerprint is detected. For example, if there is one or more second audio fingerprints matching with the first audio fingerprint, the process 103 is executed. Specifically, the first audio fingerprint uniquely identifies an audio signal. For example, the server accesses the audio fingerprint database in advance, and detect whether there exists a second audio fingerprint matching with the first audio fingerprint, and if the second audio fingerprint is detected, the process 103 is executed. In another example, if no second audio fingerprint that matches with the first audio fingerprint is detected, the server cannot identify the program, and the operation ends. In yet another example, the audio fingerprint database includes one or more second audio fingerprints, a second audio fingerprint corresponding to a second audio signal of a program.

According to yet another embodiment, during the process 103, the program associated with the matching second audio signal is provided as a result for program identification associated with the first audio signal. For example, the second audio fingerprint corresponds to a second audio signal of a program. As an example, the program associated with the second audio signal is determined based on the second audio fingerprint after the second audio fingerprint is determined based on the first audio fingerprint, and the determined program is provided as the result for program identification associated with the first audio fingerprint.

Figure 2:
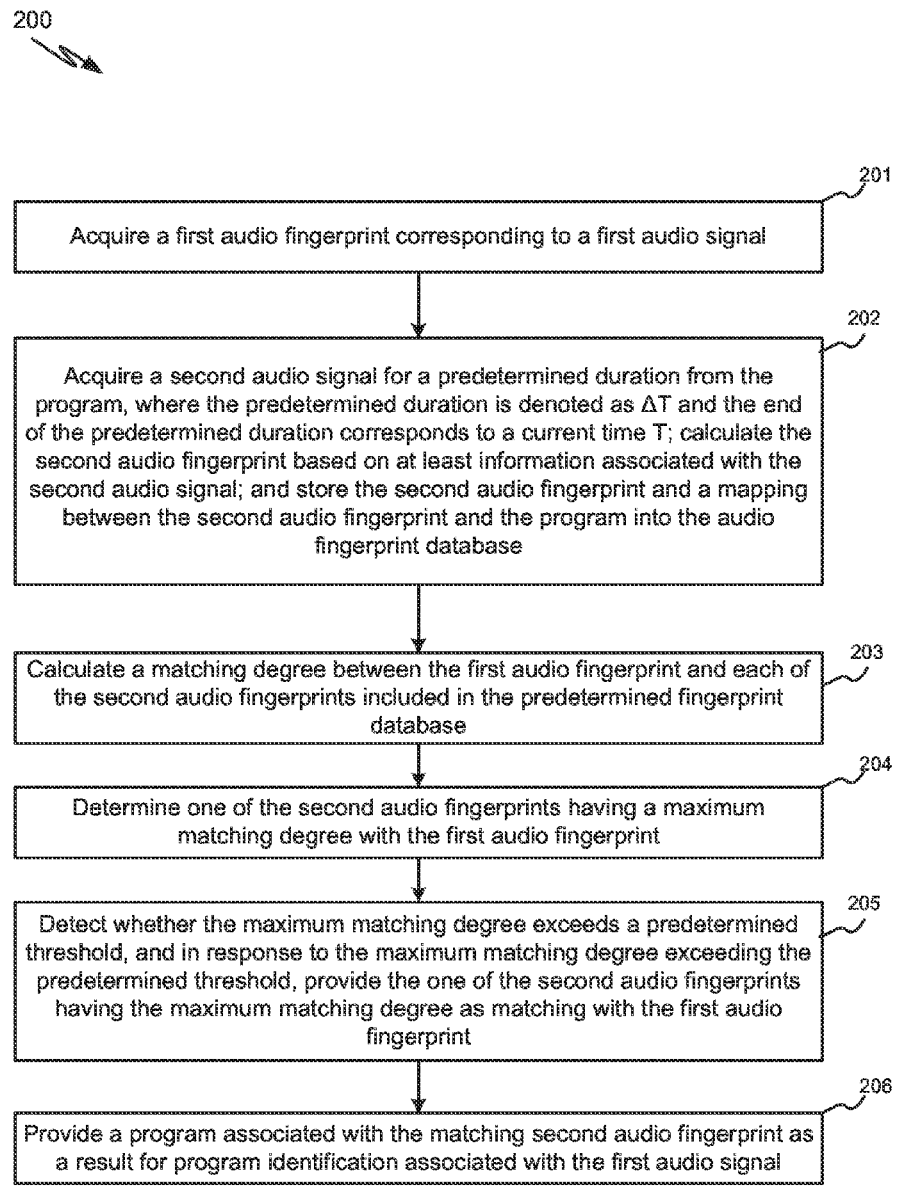
FIG. 2 is a simplified diagram showing a method for program identification according to another embodiment of the present invention.

FIG. 2 is a simplified diagram showing a method for program identification according to another embodiment of the present invention. This diagram is merely an example, which should not unduly limit the scope of the claims. One of ordinary skill in the art would recognize many variations, alternatives, and modifications. The method 200 includes at least the process 201 for acquiring a first audio fingerprint corresponding to a first audio signal, the process 202 for acquiring a second audio signal for a predetermined duration from a program, where the predetermined duration is denoted as $\Delta T$ and the end of the predetermined duration corresponds to a current time T, calculating a second audio fingerprint based on at least information associated with the second audio signal, and storing the second audio fingerprint and a mapping between the second audio fingerprint and the program into the audio fingerprint database, the process 203 for calculating a matching degree between the first audio fingerprint and each of the second audio fingerprints included in the predetermined fingerprint database, the process 204 for determining one of the second audio fingerprints having a maximum matching degree with the first audio fingerprint, the process 205 for detecting whether the maximum matching degree exceeds a predetermined threshold, and in response to the maximum matching degree exceeding the predetermined threshold, providing the one of the second audio fingerprints having the maximum matching degree as matching with the first audio fingerprint, and the process 206 for providing a program associated with the matching second audio fingerprint as a result for program identification associated with the first audio signal.

According to one embodiment, during the process 201, a first audio fingerprint corresponding to a first audio signal is acquired. According to some embodiments, the program identification is performed according to the acquired first audio signal, and the first audio signal is acquired by a microphone. According to certain embodiments, the program identification is performed according to an acquired video signal, and the video signal is acquired by a camera. In one embodiment, using audio signals for program identification improves efficiency as the video signal includes a larger amount of data than the audio signal. For example, the audio signal includes an audio stream in a format of 16-bit quantized Pulse-Code-Modulation (PCM) with a sampling frequency of 8 KHz. In another example, the first audio signal is associated with a terminal environment, and the first audio signal is acquired through the terminal. In yet another example, the terminal determines in advance a duration of the acquisition time period related to the first audio signal before the terminal acquires the first audio signal. As an example, the terminal begins to acquire the first audio signal after detecting a trigger signal, and starts to count time. The terminal stops acquiring the first audio signal after the predetermined acquisition time period. For example, if the duration of the acquisition time period is too short, the server may not accurately identify the program corresponding to the first audio signal, which may reduce the accuracy for identifying the first audio signal. In another example, if the duration of the acquisition time period is too long, resources is wasted when the terminal acquires the first audio signal and when the server identifies the first audio signal. In some embodiments, the duration of the acquisition time period is properly set according to actual needs, for example, 5-15 seconds.

According to another embodiment, the terminal directly sends the first audio signal to the server. For example, the server calculates the first audio fingerprint of the first audio signal, and identifies the first audio signal based on the first audio fingerprint. The traffic consumed for transmitting the first audio signal by the terminal is much greater than that consumed for transmitting the first audio fingerprint, and the calculation of the first audio fingerprint for the first audio signal does not require a high performance of the terminal, according to certain embodiments. The terminal calculates the first audio fingerprint for the acquired first audio signal and sends the first audio fingerprint to the server, so as to save the traffic consumed for transmitting the first audio signal, in some embodiments.

According to yet another embodiment, the server receives the first audio signal and calculates the first audio fingerprint based on the first audio signal. Specifically, the first audio signal includes one or more first peak points, and the first audio fingerprint corresponding to the first audio signal includes one or more first two-tuples, in certain embodiments. For example, each two-tuple includes a first acquisition time of a first peak point and a hash code corresponding to the first peak point. In another example, the calculating the first audio fingerprint based on the first audio signal includes: extracting one or more first peak points from the first audio signal; for each first peak point, acquiring a first acquisition time and a first acquisition frequency of the first peak point; acquiring a matching time and a matching frequency of a pairing peak point matching with the first peak point within a predetermined range; calculating a time difference between the first acquisition time and the matching time and a frequency difference between the first acquisition frequency and the matching frequency; calculating a hash value based on at least information associated with the first acquisition frequency, the time difference and the frequency difference; determining the hash value as a hash code corresponding to the first peak point; storing the first acquisition time and the hash code corresponding to the first peak point as a first two-tuple; and providing the first two-tuple as a first audio fingerprint.

In one embodiment, the server extracts one or more first peak points from the first audio signal, and calculates the first audio fingerprint of the first audio signal based on the first peak points. For example, a time-frequency analysis is performed on the first audio signal to obtain a two-dimensional time-frequency graph of the first audio signal, and the two-dimensional time-frequency graph is split into a predetermined number of time-frequency sub-graphs. As an example, a peak point corresponds to a characteristic point with a maximum energy value within a rectangular neighborhood in each time-frequency sub-graph.

In another embodiment, the server divides the first audio signal into frames to form a plurality of audio-frame signals before extracting the first peak point of the first audio signal. For example, the server divides the first audio signal into frames through a window function. As an example, the window function is a Hamming window function, a Hanning window function or a Gaussian window function, etc. In another example, in order to avoid the discontinuity between two audio-frame signals, an overlap between audio-frame signals is set when the first audio signal is divided into frames. In yet another example, the overlap is set to 16 ms, so that the content of the first 16 ms of a current audio-frame signal is the same as the content of the last 16 ms of a previous audio-frame signal.

In yet another embodiment, after acquiring the audio-frame signals, the server performs STFT (Short-Time Fourier Transform) for each audio-frame signal to obtain a frequency spectrum of each audio-frame signal, and extracts an amplitude spectrum corresponding to the frequency spectrum of each audio-frame signal. For example, the server draws the frequency spectrum and the amplitude spectrum of each audio-frame signal according to the time sequence of each audio-frame signal to form the two-dimensional time-frequency graph of the first audio signal.

According to one embodiment, the server splits a two-dimensional time-frequency graph based on at least information associated with a modulo operation of time (t) over M to generate M time-frequency sub-graphs corresponding to phase channels, where M is a positive integer. For example, characteristic points corresponding to each of certain times (e.g., t=M−1, (M−1)+M, . . . , (M−1)+xM) are selected from the two-dimensional time-frequency graph, wherein x is a positive integer and 0<(M−1)+xM≤$t_{max}$ (e.g., $t_{max}$ corresponds to a maximum time in the time-frequency graph). As an example, the selected characteristic points are used to constitute a time-frequency sub-graph (e.g., the sub-graph M) which corresponds to a phase channel of the first audio signal. The time-frequency sub-graph M corresponds to the phase channel M.

According to another embodiment, the server analyzes the energy value of each characteristic point in the time-frequency sub-graph corresponding to each phase channel, and selects the characteristic point with a maximum energy value within a rectangular neighborhood based on the energy value of each characteristic point as the first peak point. For example, the server obtains the acquisition time and the acquisition frequency of the first peak point. In another example, when matching the first peak point, the server selects a rectangular target area, and selects within the rectangular target area one or more peak points other than the first peak point to match with the first peak point. In yet another example, the one or more peak points are selected to match with the first peak point because an occurrence time associated with the selected peak points have a minimum difference than an occurrence time associated with the first peak point. In yet another example, the one or more peak points are selected to match with the first peak point because the peak points have a maximum energy value other than the first peak point. After the server determines a peak point to match with the first peak point, the server acquires a matching time of the matching peak point and a matching frequency of the matching peak point, in some embodiments.

According to yet another embodiment, the server calculates a second time difference between the acquisition time and the matching time and a second frequency difference between the acquisition frequency and the matching frequency to obtain a four-tuple (the acquisition time, the acquisition frequency, the second time difference, and the second frequency difference). For example, the server performs a hash calculation for (the acquisition frequency, the second time difference, and the second frequency difference) to obtain a hash value with a fixed number of bits, and provides the hash value as the hash code corresponding to the first peak point. In another example, each set of the first two-tuple is expressed as (the acquisition time, the hash code).

In one embodiment, the traffic consumed for transmitting the first peak point by the terminal is less than that consumed for transmitting the first audio fingerprint. For example, after determining the first peak point, the terminal sends the compressed first peak point to the server. In another example, after receiving the compressed first peak point, the server decompresses the first peak point and calculates the first two-tuple corresponding to the first peak point to generate the first audio fingerprint.

In another embodiment, the duration of the first audio signal acquired by the server is 5 to 15 seconds which may correspond to several hundred two-tuples to be tested (e.g., the first two-tuples). For example, the first audio signal includes four first two-tuples, and the first audio fingerprint is {(t1, hashcode1), (t2, hashcode2), (t3, hashcode3), (t4, hashcode4)}, where, t represents a time relative to the beginning of the acquisition of the first audio signal by the terminal. In another example, the terminal starts to acquire the first audio signal at the 20th second, and an acquisition time associated with a first peak point related to a first two-tuple is at the 21st second. Then the acquisition time of the first two-tuple is recorded as 1 second.

In yet another embodiment, the server and the terminal communicate via wired or wireless networks. For example, the first audio fingerprint is acquired via 2G (2nd Generation Mobile Communication Technology), 3G (3rd Generation Mobile Communication Technology), and/or WiFi (Wireless Fidelity).

In some embodiments, during the process 202, the second audio signal is acquired for a predetermined duration from the program, where the predetermined duration is denoted as ΔT and the end of the predetermined duration corresponds to a current time T. For example, the second audio fingerprint is calculated based on at least information associated with the second audio signal. As an example, the second audio fingerprint and a mapping between the second audio fingerprint and the program are stored into the audio fingerprint database. In another example, the audio fingerprint database comprises at least one set of second audio fingerprints. In yet another example, each set of the second audio fingerprints corresponds to the second audio signal of a program. As an example, the second audio signal is associated with a live program.

In one embodiment, the server acquires the second audio signals corresponding to all programs in advance so as to enable the identification of the first audio signal sent by the terminal. Specifically, the server acquires the second audio fingerprint of the second audio signal corresponding to the program and the mapping between the second audio fingerprint and the program, and identifies the first audio signal sent by the terminal based on the second audio fingerprint, in certain embodiments. The server can obtain the second audio fingerprint in many ways. For example, the server receives the second audio signals corresponding to all programs, and calculates a second audio fingerprint for each second audio signal. In another example, the server receives the second audio fingerprint corresponding to each program sent by other servers.

In another embodiment, the second audio signal is associated with a live program. For example, when the second audio signal is a live satellite television signal, the satellite signal is converted into TS (Transport Stream) of various satellite channels, and an audio stream is extracted from the TS stream. In another example, an audio stream is extracted in a format of 16-bit quantized PCM with a sampling frequency of 8 KHz.

In certain embodiments, when the terminal sends the acquired first audio signal to the server, a delay may occur. For example, the duration of the second audio signal acquired from the live program is set to a predetermined duration greater than the acquisition duration in order to ensure that the second audio signal acquired by the server includes the first audio signal sent by the terminal, where the predetermined duration is ΔT and the end time of the predetermined duration is the current time T. As an example, if the acquisition duration is 5-15 seconds, the predetermined duration is set to 1-2 minutes.

In some embodiments, the second audio signal includes one or more second peak points. For example, one of the second audio fingerprints corresponding to the second audio signal includes one or more reference two-tuples, a reference two-tuple including a second acquisition time of a second peak point and a second hash code corresponding to the second peak point. In another example, the calculating the second audio fingerprint based on the second audio signal includes: extracting one or more second peak points from the second audio signal; for each second peak point, acquiring a second acquisition time and a second acquisition frequency of the second peak point; acquiring a matching time and a matching frequency of a third peak point matching with the second peak point within a predetermined range; calculating a second difference between the second acquisition time and the matching time and a frequency difference between the second acquisition frequency and the matching frequency; calculating a hash value based on at least information associated with the second acquisition frequency, the second difference and the frequency difference; determining the hash value as a hash code corresponding to the second peak point; storing the second acquisition time and the hash code corresponding to the second peak point as a reference two-tuple; and providing the reference two-tuple as a second audio fingerprint.

In certain embodiments, an audio signal of 1-2 minutes includes several thousand reference two-tuples. For example, the audio signal includes m reference two-tuples. In another example, the second audio fingerprint is {(T11, hashcode11), (T12, hashcode12), . . . , (T1n, hashcode1n), (T1n+1, hashcode1 n+1), (T1n+2, hashcode1n+2), (T1n+3, hashcode1n+3), . . . , (T1m, hashcode1m)}, where T represents the actual acquisition time of the audio signal. As an example, if the actual acquisition time associated with a second peak point related to a reference two-tuple is the 21st second, the acquisition time of the reference two-tuple is recorded as the 21st second. For example, the process for calculating the second audio fingerprint based on the second audio signal by the server is the same as the process for calculating the first audio fingerprint based on the first audio signal by the server (e.g., the process 201).

In some embodiments, when storing the mapping between the second audio fingerprint and the program, the program is used as a primary index, and the hash code is used as a secondary index. For example, the reference two-tuples with a same program identification are taken as a sequence, and each reference two-tuple in the sequence is arranged in an ascending order of the hash codes. In certain embodiments, the hash code is used as the primary index, and the program identification as the secondary index. For example, the reference two-tuples with a same hash code is taken as a sequence.

In one embodiment, during the process 203, a matching degree between the first audio fingerprint and each of the second audio fingerprints included in the predetermined fingerprint database is calculated. For example, the first audio signal includes one or more first peak points, and the first audio fingerprint corresponding to the first audio signal includes one or more first two-tuples, a first two-tuple including a first acquisition time of a first peak point and a first hash code corresponding to the first peak point. In another example, the second audio signal includes one or more second peak points, and one of the second audio fingerprints corresponding to the second audio signal includes one or more reference two-tuples, a reference two-tuple including a second acquisition time of a second peak point and a second hash code corresponding to the second peak point. In yet another example, the calculating a matching degree between the first audio fingerprint and each of the second audio fingerprints included in the predetermined fingerprint database includes: for each first two-tuple and each reference two-tuple, detecting whether the first hash code of the first two-tuple is the same as the second hash code of the reference two-tuple; in response to the first hash code of the first two-tuple being the same as the second hash code of the reference two-tuple, calculating a time difference between the first acquisition time of the first two-tuple and the second acquisition time of the reference two-tuple; calculating a cumulative number based on at least information associated with the time difference between the first acquisition time of the first two-tuple and the second acquisition time of the reference two-tuple; and determining a maximum cumulative number based on at least information associated with the cumulative numbers related to the first audio fingerprint and the second audio fingerprints as the matching degree of the first audio fingerprint and each of the second audio fingerprints.

In some embodiments, after the first audio fingerprint has a same hash code as a second audio fingerprint, three time differences are calculated, and the cumulative numbers associated with the three different time differences are 4, 27 and 9. The matching degree between the first audio fingerprint and the second audio fingerprint is 27, in certain embodiments.

In one embodiment, t represents a time relative to the beginning of the acquisition of the first audio signal by the terminal, and T represents the actual acquisition time of the second audio signal. For example, a calculated $\Delta t$ represents the time of the acquisition of the first audio signal by the terminal.

In another embodiment, during the process 204, one of the second audio fingerprints having a maximum matching degree with the first audio fingerprint is determined. For example, the higher the matching degree between the first audio fingerprint and a second audio fingerprint is, the more possible the first audio signal sent by the terminal corresponds to the second audio signal of the program. In another example, the server determines a maximum matching degree from the calculated matching degrees, and determines one of the second audio fingerprints with the maximum matching degree as the fingerprint matching with the first audio fingerprint.

In yet another embodiment, during the process 205, whether the maximum matching degree exceeds a predetermined threshold is detected. For example, in response to the maximum matching degree exceeding the predetermined threshold, the one of the second audio fingerprints having the maximum matching degree is provided as matching with the first audio fingerprint. In another example, the predetermined threshold is set to avoid a matching-degree problem between the first audio fingerprint and the second audio fingerprint caused by a calculation error. In yet another example, after detecting that the maximum matching degree exceeds the predetermined threshold, the server determines the second audio fingerprint corresponding to the maximum matching degree as the second audio fingerprint matching with the first audio fingerprint, so as to increase the accuracy of the matching between first audio fingerprint and the second audio fingerprint.

According to one embodiment, during the process 206, in response to one of the second audio fingerprints matching with the first audio fingerprint, a program associated with the matching second audio signal is provided as a result for program identification associated with the first audio signal. For example, the second audio fingerprints correspond to the second audio signal of a program. In another example, once one of the second audio fingerprints is determined to match with the first audio fingerprint, the program corresponding to the matching second audio signal is determined based on the matching second audio fingerprint, and is provided as the result for program identification associated with the first audio fingerprint.

Figure 3:
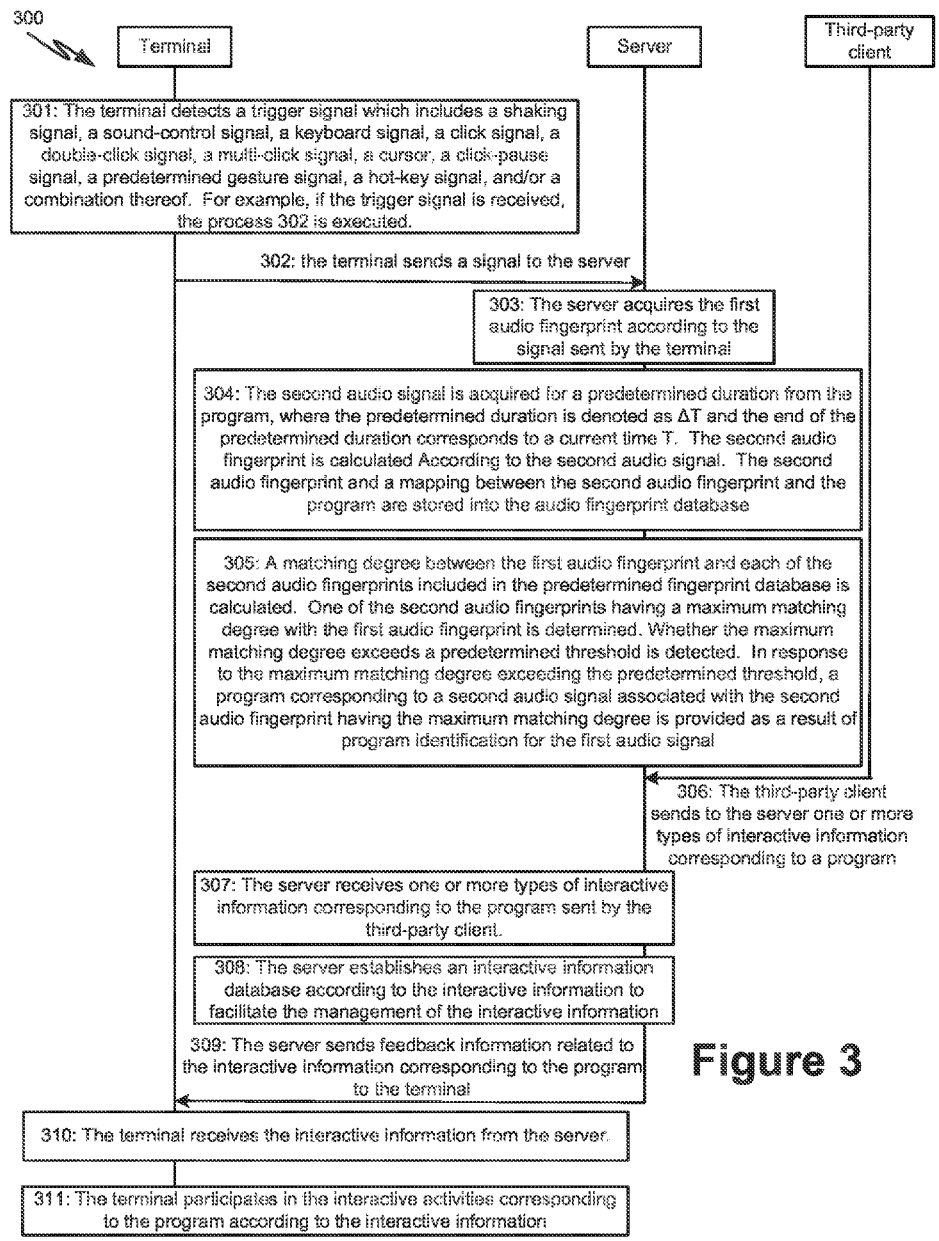
FIG. 3 is a simplified diagram showing a method for program identification according to yet another embodiment of the present invention.

FIG. 3 is a simplified diagram showing a method for program identification according to yet another embodiment of the present invention. This diagram is merely an example, which should not unduly limit the scope of the claims. One of ordinary skill in the art would recognize many variations, alternatives, and modifications. The method 300 includes at least the processes 301-311.

According to one embodiment, during the process 301, the terminal detects a trigger signal which includes any one and/or any combination of a shaking signal, a sound-control signal, a keyboard signal, a click signal, a double-click signal, a multi-click signal, a cursor, a click-pause signal, a predetermined gesture signal, and a hot-key signal. For example, if the trigger signal is received, the process 302 is executed. In another example, to avoid wasting resources caused by a real-time signal acquisition by the terminal, the terminal is provided with a trigger operation. In yet another example, if the terminal receives the trigger signal associated with the trigger operation, the process 302 is executed for acquiring audio signals associated with the terminal environment.

In one embodiment, the trigger signal includes any one and/or any combination of a shaking signal, a sound-control signal, a keyboard signal, a click signal, a double-click signal, a multi-click signal, a cursor, a click-pause signal, a predetermined gesture signal, and a hot-key signal. For example, the trigger signal is generated by a user clicking the keyboard or the touch screen. In another example, a click on the keyboard or a click on the touch screen may cause damages to the terminal devices so as to reduce the life of the terminal. In yet another example, sensor in the terminal is used to determine whether the trigger signal is received.

In yet another embodiment, the terminal acquires an acceleration of the terminal through a gravity-acceleration sensor and determines whether the acceleration satisfies a predetermined condition. For example, if the acceleration satisfies the predetermined condition, it is determined that the acceleration is a trigger signal. In another example, the terminal acquires the sound signal from the terminal through a microphone and determines whether the sound signal satisfies a predetermined condition. As an example, if the sound signal satisfies the predetermined condition, it is determined that the audio signal is a trigger signal.

Specifically, if the trigger signal is a shaking signal, whether the trigger signal is received is determined, in some embodiments. For example, the acceleration of the terminal within a predetermined time period is acquired via the gravity-acceleration sensor. In another example, whether a direction of the acceleration changes for a predetermined number of times is detected. In yet another example, if the direction of the acceleration changes for the predetermined number of times, it is determined that the trigger signal is received.

According to certain embodiments, the gravity-acceleration sensor is a three-axis accelerometer, or a three-axis gyroscope. For example, to use the sensor, a coordinate system for the terminal is established based on three lines along which three sensitive axes of the sensor are located. In another example, the three sensitive axes correspond to a length, a width and a height of the terminal respectively. In some embodiments, the coordinate system is established based on at least information associated with the sensitive axes. For example, an interface of the terminal is set as an x-z plane. A center of the terminal corresponds to a coordinate origin, an axis pointing to the right of the terminal corresponds to a positive axis of the x-axis, and an axis on the terminal plane perpendicular to the x-axis corresponds to the z-axis. As an example, an axis within the x-z plane pointing to the top of the terminal corresponds to a positive axis of the z-axis, an axis perpendicular to the terminal plane corresponds to the y-axis, and an axis pointing out of the x-z plane towards the top of the terminal corresponds to a positive axis of the y-axis.

Figure 4:
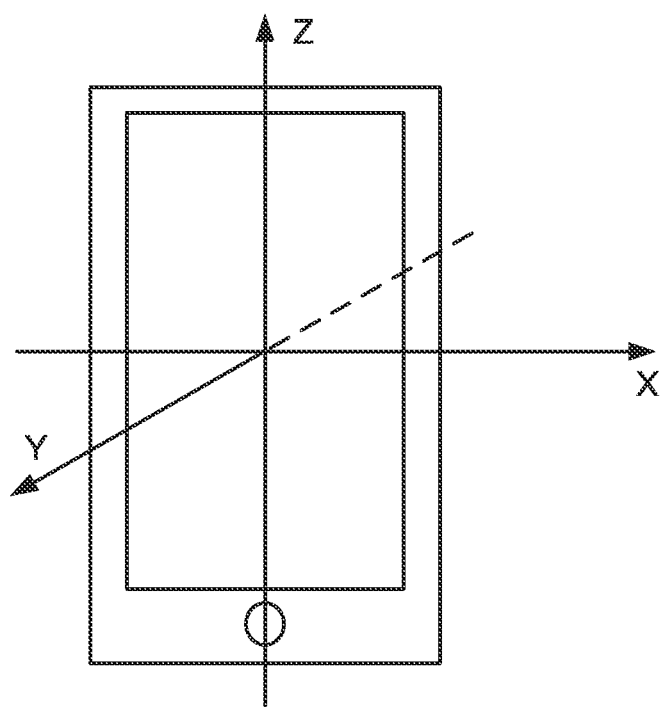
FIG. 4 is a simplified diagram showing a coordinate system for a mobile terminal with a vertical reading direction according to one embodiment of the present invention.

FIG. 4 is a simplified diagram showing a coordinate system for a mobile terminal with a vertical reading direction according to one embodiment of the present invention. This diagram is merely an example, which should not unduly limit the scope of the claims. One of ordinary skill in the art would recognize many variations, alternatives, and modifications. For example, the mobile terminal is a cell phone.

Figure 5:
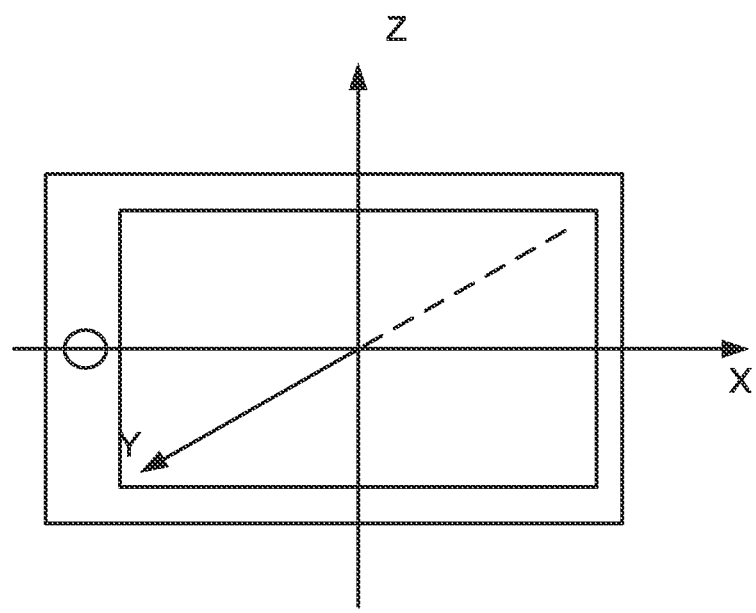
FIG. 5 is a simplified diagram showing a coordinate system for a mobile terminal with a horizontal reading direction according to one embodiment of the present invention.

FIG. 5 is a simplified diagram showing a coordinate system for a mobile terminal with a horizontal reading direction according to one embodiment of the present invention. This diagram is merely an example, which should not unduly limit the scope of the claims. One of ordinary skill in the art would recognize many variations, alternatives, and modifications. For example, the mobile terminal is a tablet.

In some embodiments, after the acceleration of the terminal is obtained through the gravity-acceleration sensor, the terminal shakes along the x-axis direction, and then whether the direction of the acceleration changes for a predetermined number of times in the x-axis direction is detected. For example, if the direction of acceleration changes for a predetermined number of times in the x-axis direction, it is determined that the trigger signal is received. In another example, if the direction of acceleration does not change for a predetermined number of times in the x-axis direction, it is determined that the trigger signal is not received. For example, if the x-axis direction corresponds to a left-to-right direction, the direction of acceleration changing from right to left is counted as one direction change.

In certain embodiments, to improve the accuracy of detecting the trigger signal by the terminal, whether the acceleration exceeds a predetermined threshold is detected. For example, if the direction of acceleration changes for a predetermined number of times and the acceleration exceeds the predetermined threshold, it is determined that the terminal receives the trigger signal.

According to one embodiment, after the acceleration a is obtained through the sensor, the acceleration a is decomposed along the x-axis, the y-axis and the z-axis to obtain acceleration components ax, ay and az corresponding to the three axes. For example, if the terminal is shaking along the x-axis, an acceleration threshold along the x-axis is set to be $a_{x0}$, and whether the magnitude of ax exceeds the threshold $a_{x0}$ is detected. As an example, if the magnitude of ax exceeds the threshold $a_{x0}$, it is determined that the magnitude of the acceleration component ax is larger than the threshold $a_{x0}$, and thus it is determined that the trigger signal is received.

Figure 6:
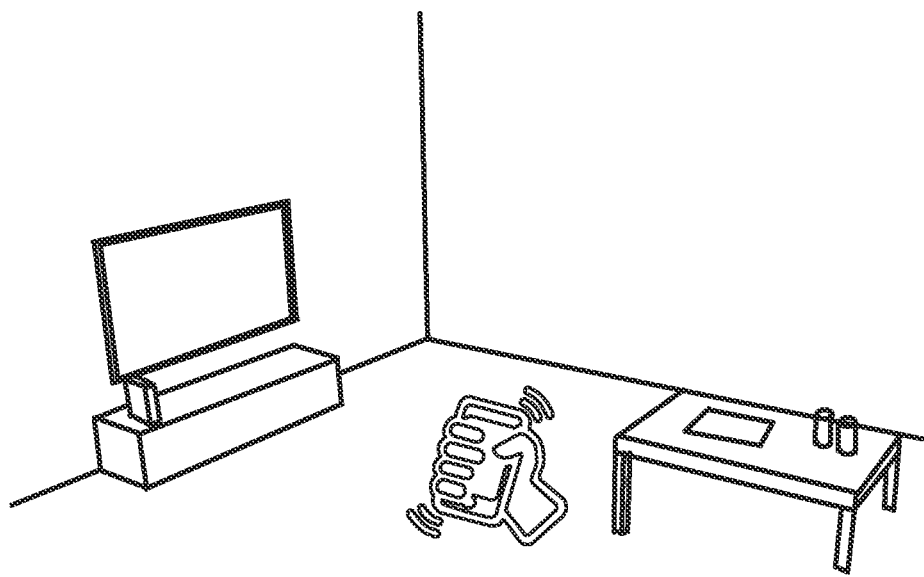
FIG. 6 is a simplified diagram showing a user shaking a terminal when watching a TV program according to one embodiment of the present invention.

FIG. 6 is a simplified diagram showing a user shaking a terminal when watching a TV program according to one embodiment of the present invention. This diagram is merely an example, which should not unduly limit the scope of the claims. One of ordinary skill in the art would recognize many variations, alternatives, and modifications.

Figure 7:
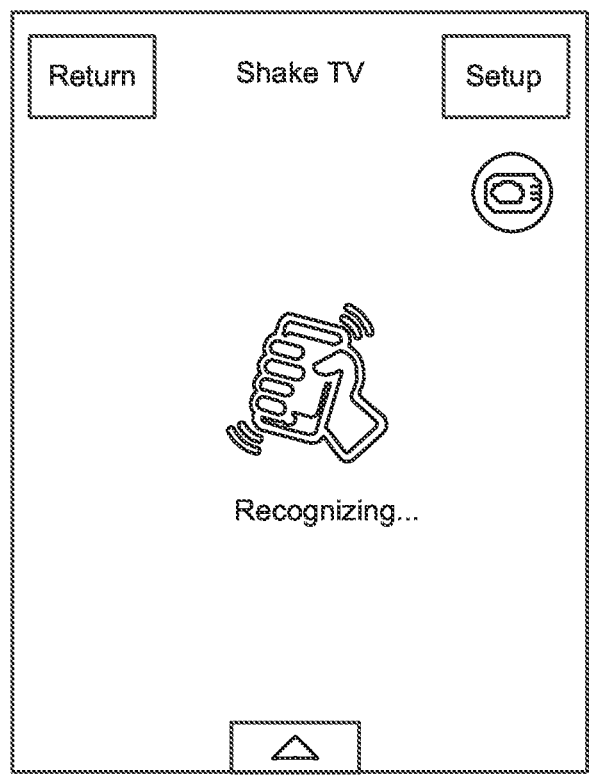
FIG. 7 is a simplified diagram showing an interface associated with a program-identification application that starts in response to a user shaking a terminal according to one embodiment of the present invention.

FIG. 7 is a simplified diagram showing an interface associated with a program-identification application that starts in response to a user shaking a terminal according to one embodiment of the present invention. This diagram is merely an example, which should not unduly limit the scope of the claims. One of ordinary skill in the art would recognize many variations, alternatives, and modifications.

Referring back to FIG. 3, during the process 302, the terminal sends a signal to the server, in some embodiments. For example, the terminal sends the first audio signal to the server, and the server obtains the first audio fingerprint based on the first audio signal. In another example, the first audio fingerprint corresponds to the audio signal of the terminal environment. As an example, the program associated with the first audio signal is identified based on the first audio fingerprint.

According to one embodiment, the terminal directly sends the first audio signal to the server. For example, the server calculates the first audio fingerprint of the first audio signal, and identifies the first audio signal based on the first audio fingerprint. The traffic consumed for transmitting the first audio signal by the terminal is much greater than that consumed for transmitting the first audio fingerprint, and the calculation of the first audio fingerprint for the first audio signal does not require a high performance of the terminal, in some embodiments. The terminal calculates the first audio fingerprint for the acquired first audio signal and sends the first audio fingerprint to the server, so as to save the traffic consumed for transmitting the first audio signal, in certain embodiments.

Specifically, the first audio signal includes one or more first peak points, and the first audio fingerprint corresponding to the first audio signal includes one or more first two-tuples, in certain embodiments. For example, each two-tuple includes a first acquisition time of a first peak point and a hash code corresponding to the first peak point. In another example, the calculating the first audio fingerprint based on the first audio signal includes: extracting one or more first peak points from the first audio signal; for each first peak point, acquiring a first acquisition time and a first acquisition frequency of the first peak point; acquiring a matching time and a matching frequency of a pairing peak point matching with the first peak point within a predetermined range; calculating a time difference between the first acquisition time and the matching time and a frequency difference between the first acquisition frequency and the matching frequency; calculating a hash value based on at least information associated with the first acquisition frequency, the time difference and the frequency difference; determining the hash value as a hash code corresponding to the first peak point; storing the first acquisition time and the hash code corresponding to the first peak point as a first two-tuple; and providing the first two-tuple as a first audio fingerprint. As an example, the process for calculating the first audio fingerprint based on the first audio signal by the terminal is the same as the process for calculating the first audio fingerprint based on the first audio signal by the server (e.g., the process 201).

In one embodiment, the server and the terminal communicate via wired or wireless networks. For example, the first audio fingerprint is acquired via 2G (2nd Generation Mobile Communication Technology), 3G (3rd Generation Mobile Communication Technology), and/or WiFi (Wireless Fidelity).

In another embodiment, during the process 303, the server acquires the first audio fingerprint according to the signal sent by the terminal. For example, the server calculates the first audio fingerprint based on the first audio signal. In another example, the server receives the first audio fingerprint obtained by the terminal's calculation based on the first audio signal.

In yet another embodiment, during the process 304, the second audio signal is acquired for a predetermined duration from the program, where the predetermined duration is denoted as $\Delta T$ and the end of the predetermined duration corresponds to a current time T. For example, the second audio fingerprint is calculated based on at least information associated with the second audio signal. As an example, the second audio fingerprint and a mapping between the second audio fingerprint and the program are stored into the audio fingerprint database.

In yet another embodiment, the audio fingerprint database includes one or more sets of second audio fingerprints. For example, each set of second audio fingerprints correspond to a second audio signal of a program, and the second audio signal is associated with a live program.

In some embodiments, the second audio signal includes one or more second peak points. For example, one of the second audio fingerprints corresponding to the second audio signal includes one or more reference two-tuples, a reference two-tuple including a second acquisition time of a second peak point and a second hash code corresponding to the second peak point. In another example, the calculating the second audio fingerprint based on the second audio signal includes: extracting one or more second peak points from the second audio signal; for each second peak point, acquiring a second acquisition time and a second acquisition frequency of the second peak point; acquiring a matching time and a matching frequency of a third peak point matching with the second peak point within a predetermined range; calculating a second difference between the second acquisition time and the matching time and a frequency difference between the second acquisition frequency and the matching frequency; calculating a hash value based on at least information associated with the second acquisition frequency, the second difference and the frequency difference; determining the hash value as a hash code corresponding to the second peak point; storing the second acquisition time and the hash code corresponding to the second peak point as a reference two-tuple; and providing the reference two-tuple as a second audio fingerprint. In certain embodiments, the process for calculating the second audio fingerprint based on the second audio signal by the server is the same as the process for calculating the first audio fingerprint based on the first audio signal by the server (e.g., the process 201).

According to one embodiment, during the process 305, a matching degree between the first audio fingerprint and each of the second audio fingerprints included in the predetermined fingerprint database is calculated. For example, one of the second audio fingerprints having a maximum matching degree with the first audio fingerprint is determined. As an example, whether the maximum matching degree exceeds a predetermined threshold is detected. In response to the maximum matching degree exceeding the predetermined threshold, a program corresponding to a second audio signal associated with the second audio fingerprint having the maximum matching degree is provided as a result of program identification for the first audio signal, in some embodiments.

According to another embodiment, the first audio signal includes one or more first peak points, and the first audio fingerprint corresponding to the first audio signal includes one or more first two-tuples, a first two-tuple including a first acquisition time of a first peak point and a first hash code corresponding to the first peak point. In another example, the second audio signal includes one or more second peak points, and one of the second audio fingerprints corresponding to the second audio signal includes one or more reference two-tuples, a reference two-tuple including a second acquisition time of a second peak point and a second hash code corresponding to the second peak point. In yet another example, the calculating a matching degree between the first audio fingerprint and each of the second audio fingerprints included in the predetermined fingerprint database includes: for each first two-tuple and each reference two-tuple, detecting whether the first hash code of the first two-tuple is the same as the second hash code of the reference two-tuple; in response to the first hash code of the first two-tuple being the same as the second hash code of the reference two-tuple, calculating a time difference between the first acquisition time of the first two-tuple and the second acquisition time of the reference two-tuple; calculating a cumulative number based on at least information associated with the time difference between the first acquisition time of the first two-tuple and the second acquisition time of the reference two-tuple; and determining a maximum cumulative number based on at least information associated with the cumulative numbers related to the first audio fingerprint and the second audio fingerprints as the matching degree of the first audio fingerprint and each of the second audio fingerprints. In some embodiments, the process during which the server detects whether the audio fingerprint database has the second audio fingerprint matching with the first audio fingerprint is the same as the process 203.

According to yet another embodiment, during the process 306, a third-party client sends to the server one or more types of interactive information corresponding to a program. For example, the third-party client edits in advance the interactive information associated with certain interactive activities to be carried out in the program, and sends the edited interactive information to the server so that the server forwards the interactive information to the terminal. In another example, the third-party client includes a radio station.

In some embodiments, to improve the security of program identification, the third-party client is authenticated to avoid issuance of malicious interactive information, so as to avoid participating in false interactive activities by the terminal and improve the security of interactive activities. For example, the third-party client applies for a public account to the server. As an example, after the third-party client passes the authentication of the server, the server grants a public account to the third-party client. The third-party client can use this public account to log onto the server and edit or send interactive information using the public account.

In one embodiment, during the process 307, the server receives one or more types of interactive information corresponding to the program sent by the third-party client. For example, during the process 308, the server establishes an interactive information database according to the one or more types of interactive information to facilitate the management of the interactive information.

In another embodiment, during the process 309, the server sends feedback information related to the interactive information corresponding to the program to the terminal. For example, the server stores a mapping between the second audio fingerprint and the program in advance when establishing the audio fingerprint database. As an example, the second audio fingerprint is used to determine the corresponding program, and interactive information associated with the program is obtained for the terminal to participate in interactive activities corresponding to the program. Specifically, the program is determined using a unique program identification, and the server stores in advance the mapping between the second audio fingerprint and the program identification, in some embodiments. For example, the program identification corresponding to the second audio fingerprint is obtained after the second audio fingerprint is determined. In another example, the interactive information includes the program identification. The server can locate the interactive information using a program identification and determine the located interactive information as the interactive information corresponding to the program, in certain embodiments. For example, if interactive activities currently exist, the server sends the interactive information to the terminal. In another example, if the interactive activities do not exist, the server sends an indicative response to the terminal.

In yet another embodiment, during the process 310, the terminal receives the interactive information from the server. For example, if the interactive activities currently exist, the terminal receives the interactive information from the server and performs the process 311. In another example, if the interactive activities do not exist, the terminal receives the indicative response from the server, and ends the process for program identification accordingly.

In some embodiments, during the process 311, the terminal participates in the interactive activities corresponding to the program according to the interactive information. For example, the interactive information includes an introduction of interactive activities, such as an introduction of rules, a method for participation, and promotional contents. As an example, the terminal can participate in interactive activities according to the interactive information.

Figure 8:
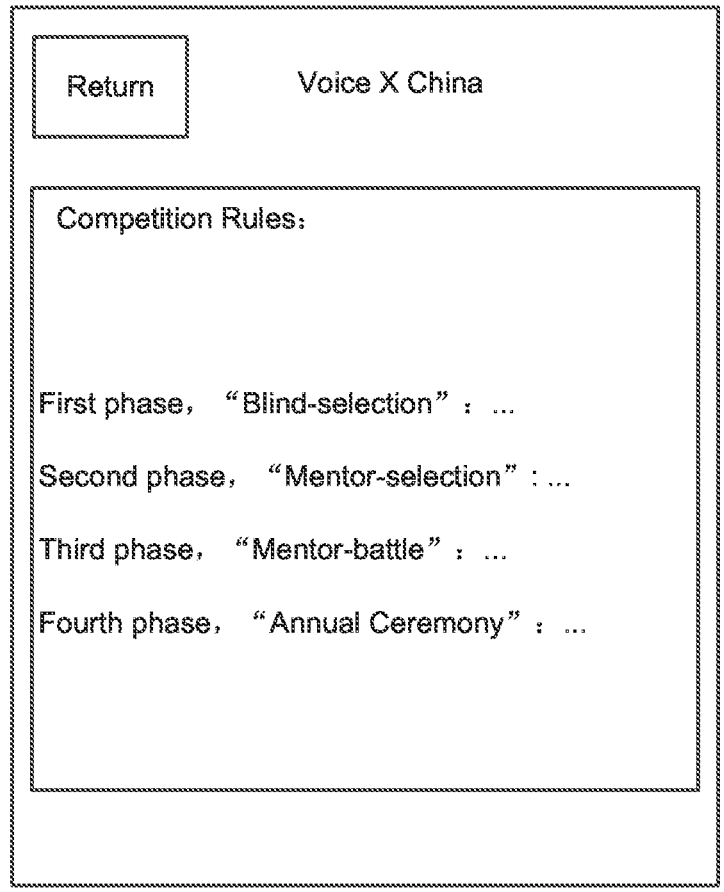
FIG. 8 is a simplified diagram showing an interface for certain interaction rules according to one embodiment of the present invention.

FIG. 8 is a simplified diagram showing an interface for certain interaction rules according to one embodiment of the present invention. This diagram is merely an example, which should not unduly limit the scope of the claims. One of ordinary skill in the art would recognize many variations, alternatives, and modifications. According to one embodiment, after the interactive information is clicked on the terminal, the interface for the interaction rules is displayed. As shown in FIG. 8, the interface includes the introduction of the rules for interactive activities. For example, the interface includes an application interface, an interface provided by a public-account interface, or a webpage provided by an application or a third party.

Figure 9:
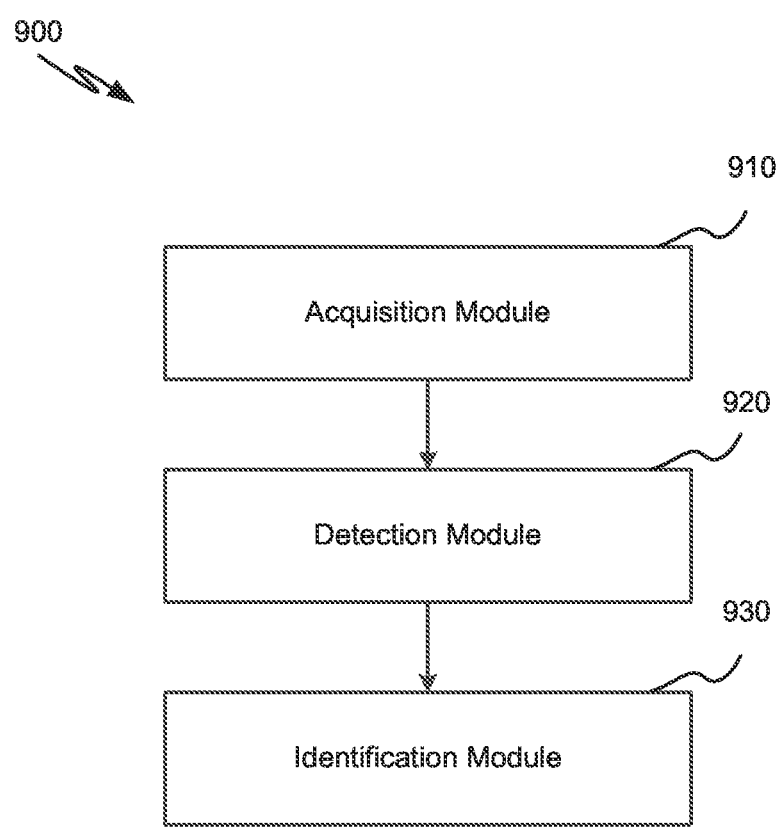
FIG. 9 is a simplified diagram showing an apparatus for program identification according to one embodiment of the present invention.

FIG. 9 is a simplified diagram showing an apparatus for program identification according to one embodiment of the present invention. This diagram is merely an example, which should not unduly limit the scope of the claims. One of ordinary skill in the art would recognize many variations, alternatives, and modifications. The apparatus for program identification 900 includes an acquisition module 910, a detection module 920, and an identification module 930.

According to one embodiment, the acquisition module 910 is configured to acquire a first audio fingerprint corresponding to a first audio signal. The detection module 920 is configured to detect whether one or more second audio fingerprints in a predetermined fingerprint database match with the first audio fingerprint, a second audio fingerprint corresponding to a second audio signal. The identification module 930 is configured to, in response to one of the second audio fingerprints matching with the first audio fingerprint, provide a program associated with the matching second audio signal as a result for program identification associated with the first audio signal.

Figure 10:
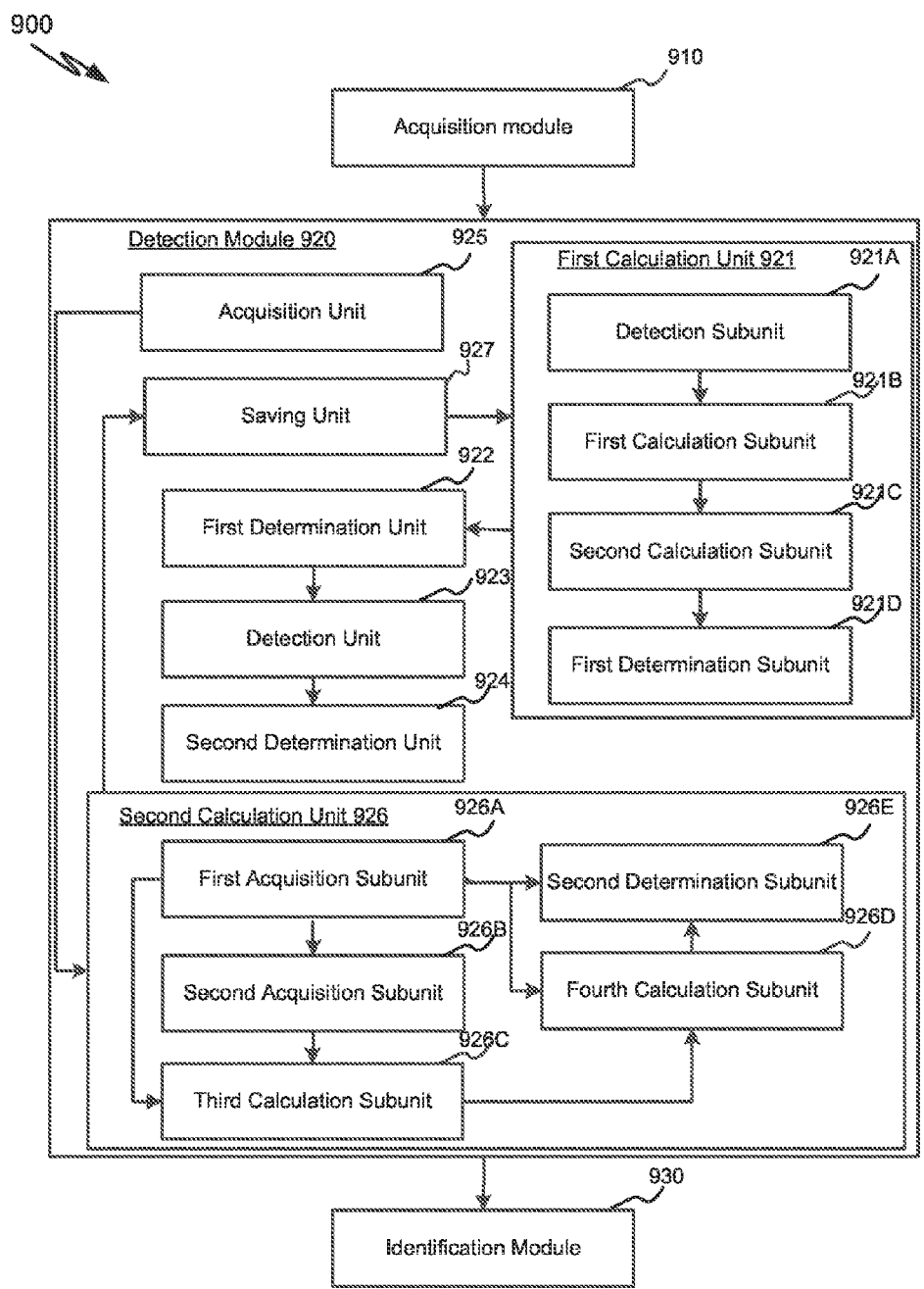
FIG. 10 is a simplified diagram showing an apparatus for program identification according to another embodiment of the present invention.

FIG. 10 is a simplified diagram showing the apparatus 900 for program identification according to another embodiment of the present invention. This diagram is merely an example, which should not unduly limit the scope of the claims. One of ordinary skill in the art would recognize many variations, alternatives, and modifications.

In some embodiments, the detection module 920 includes a first calculation unit 921, a first determination unit 922, a detection unit 923, and a second determination unit 924. For example, the first calculation unit 921 is configured to calculate a matching degree between the first audio fingerprint and each of the second audio fingerprints included in the predetermined fingerprint database. In another example, the first determination unit 922 is configured to determine one of the second audio fingerprints having a maximum matching degree with the first audio fingerprint. As an example, the detection unit 923 is configured to detect whether the maximum matching degree exceeds a predetermined threshold. In another example, the second determination unit 924 is configured, to in response to the maximum matching degree exceeding the predetermined threshold, provide the one of the second audio fingerprints having the maximum matching degree as matching with the first audio fingerprint.

In certain embodiments, the first audio signal includes one or more first peak points. For example, the first audio fingerprint corresponding to the first audio signal includes one or more first two-tuples, a first two-tuple including a first acquisition time of a first peak point and a first hash code corresponding to the first peak point. In another example, the second audio signal includes one or more second peak points. In yet another example, one of the second audio fingerprints corresponding to the second audio signal includes one or more reference two-tuples, a reference two-tuple including a second acquisition time of a second peak point and a second hash code corresponding to the second peak point.

In one embodiment, the first calculation unit 921 includes a detection subunit 921A, a first calculation subunit 921B, a second calculation subunit 921C, and a first determination subunit 921D. For example, the detection subunit 921A is configured to detect, for each first two-tuple and each reference two-tuple, whether the first hash code of the first two-tuple is the same as the second hash code of the reference two-tuple. In another example, the first calculation subunit 921B is configured to, in response to the first hash code of the first two-tuple being the same as the second hash code of the reference two-tuple, calculate a first difference between the first acquisition time of the first two-tuple and the second acquisition time of the reference two-tuple. In yet another example, the second calculation subunit 921C is configured to calculate a cumulative number based on at least information associated with the first difference between the first acquisition time of the first two-tuple and the second acquisition time of the reference two-tuple. In yet another example, the first determination subunit 921D is configured to determine a maximum cumulative number based on at least information associated with the cumulative numbers related to the first audio fingerprint and the second audio fingerprints as the matching degree of the first audio fingerprint and each of the second audio fingerprints.

In another embodiment, the detection module 920 further includes an acquisition unit 925, a second calculation unit 926, and a saving unit 927. For example, the acquisition unit 925 is configured to acquire the second audio signal for a predetermined duration from the program, wherein the predetermined duration is denoted as ΔT and the end of the predetermined duration corresponds to a current time T. In another example, the second calculation unit 926 is configured to calculating the second audio fingerprint based on at least information associated with the second audio signal. In yet another example, the saving unit 927 is configured to store the second audio fingerprint and a mapping between the second audio fingerprint and the program into the audio fingerprint database.

In yet another embodiment, the second calculation unit 926 includes a first acquisition subunit 926A, a second acquisition subunit 926B, a third calculation subunit 926C, a fourth calculation subunit 926D, and a second determination subunit 926E. For example, the first acquisition subunit 926A is configured to extract one or more second peak points from the second audio signal, and for each second peak point, acquire a second acquisition time and a second acquisition frequency of the second peak point. In another example, the second acquisition subunit 926B is configured to acquire a matching time and a matching frequency of a third peak point matching with the second peak point within a predetermined range. In yet another example, the third calculation subunit 926C is configured to calculate a second difference between the second acquisition time and the matching time and a frequency difference between the second acquisition frequency and the matching frequency. As an example, the fourth calculation subunit 926D is configured to calculate a hash value based on at least information associated with the second acquisition frequency, the second difference and the frequency difference, and determine the hash value as a hash code corresponding to the second peak point. In another example, the second determination subunit 926E is configured to store the second acquisition time and the hash code corresponding to the second peak point as a reference two-tuple, and provide the reference two-tuple as a second audio fingerprint. In yet another example, the first audio signal is associated with a terminal environment, and the second audio signal is associated with a live program.

According to one embodiment, a method is provided for program identification. For example, a first audio fingerprint corresponding to a first audio signal is acquired; whether one or more second audio fingerprints in a predetermined fingerprint database match with the first audio fingerprint is detected, a second audio fingerprint corresponding to a second audio signal; and in response to one of the second audio fingerprints matching with the first audio fingerprint, a program associated with the matching second audio signal is provided as a result for program identification associated with the first audio signal. For example, the method is implemented according to at least FIG. 1, FIG. 2, and/or FIG. 3.

According to another embodiment, an apparatus for program identification includes an acquisition module, a detection module, and an identification module. The acquisition module is configured to acquire a first audio fingerprint corresponding to a first audio signal. The detection module is configured to detect whether one or more second audio fingerprints in a predetermined fingerprint database match with the first audio fingerprint, a second audio fingerprint corresponding to a second audio signal. The identification module is configured to, in response to one of the second audio fingerprints matching with the first audio fingerprint, provide a program associated with the matching second audio signal as a result for program identification associated with the first audio signal. For example, the apparatus is implemented according to at least FIG. 9, and/or FIG. 10.

According to yet another embodiment, a server comprises an apparatus for program identification. The apparatus includes: an acquisition module, a detection module, and an identification module. The acquisition module is configured to acquire a first audio fingerprint corresponding to a first audio signal. The detection module is configured to detect whether one or more second audio fingerprints in a predetermined fingerprint database match with the first audio fingerprint, a second audio fingerprint corresponding to a second audio signal. The identification module is configured to, in response to one of the second audio fingerprints matching with the first audio fingerprint, provide a program associated with the matching second audio signal as a result for program identification associated with the first audio signal. For example, the server is implemented according to at least FIG. 9, and/or FIG. 10.

According to yet another embodiment, a non-transitory computer readable storage medium comprises programming instructions for program identification. The programming instructions are configured to cause one or more data processors to execute certain operations. For example, a first audio fingerprint corresponding to a first audio signal is acquired; whether one or more second audio fingerprints in a predetermined fingerprint database match with the first audio fingerprint is detected, a second audio fingerprint corresponding to a second audio signal; and in response to one of the second audio fingerprints matching with the first audio fingerprint, a program associated with the matching second audio signal is provided as a result for program identification associated with the first audio signal. For example, the storage medium is implemented according to at least FIG. 1, FIG. 2, and/or FIG. 3.

The above only describes several scenarios presented by this invention, and the description is relatively specific and detailed, yet it cannot therefore be understood as limiting the scope of this invention's patent. It should be noted that ordinary technicians in the field may also, without deviating from the invention's conceptual premises, make a number of variations and modifications, which are all within the scope of this invention. As a result, in terms of protection, the patent claims shall prevail.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention is combined.

Additionally, the methods and systems described herein is implemented on many different types of processing devices by program code comprising program instructions that are executable by the device processing subsystem. The software program instructions includes source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) is stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods is provided on many different types of computer-readable media including computer storage mechanisms (e.g., CD-ROM, diskette. RAM, flash memory, computer's hard drive, etc.) that contain instructions (e.g., software) for use in execution by a processor to perform the methods' operations and implement the systems described herein.

The computer components, software modules, functions, data stores and data structures described herein is connected directly or indirectly to each other in order to allow the flow of data needed for their operations. It is also noted that a module or processor includes but is not limited to a unit of code that performs a software operation, and is implemented for example as a subroutine unit of code, or as a software function unit of code, or as an object (as in an object-oriented paradigm), or as an applet, or in a computer script language, or as another type of computer code. The software components and/or functionality is located on a single computer or distributed across multiple computers depending upon the situation at hand.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope or of what is claimed, but rather as descriptions of features specific to particular embodiments. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features is described above as acting in certain combinations and even initially claimed as such, one or more features from a claimed combination can in some cases be excised from the combination, and the claimed combination is directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing is advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for program identification, the method comprising:

acquiring a first audio fingerprint corresponding to a first audio signal;

detecting whether one or more second audio fingerprints in a predetermined fingerprint database match with the first audio fingerprint, the one or more second audio fingerprints corresponding to a second audio signal associated with a program; and in response to one of the second audio fingerprints matching with the first audio fingerprint, providing the program associated with the matching second audio signal as a result for program identification associated with the first audio signal;

wherein the detecting whether one or more second audio fingerprints in a predetermined fingerprint database match with the first audio fingerprint includes:

calculating a matching degree between the first audio fingerprint and each of the second audio fingerprints included in the predetermined fingerprint database;

determining one of the second audio fingerprints having a maximum matching degree with the first audio fingerprint;

detecting whether the maximum matching degree exceeds a predetermined threshold; and in response to the maximum matching degree exceeding the predetermined threshold, providing the one of the second audio fingerprints having the maximum matching degree as matching with the first audio fingerprint;

wherein:

the first audio signal includes one or more first peak points;

the first audio fingerprint corresponding to the first audio signal includes one or more first two-tuples, a first two-tuple including a first acquisition time of a first peak point and a first hash code corresponding to the first peak point;

the second audio signal includes one or more second peak points;

one of the second audio fingerprints corresponding to the second audio signal includes one or more reference two-tuples, a reference two-tuple including a second acquisition time of a second peak point and a second hash code corresponding to the second peak point;

the calculating a matching degree between the first audio fingerprint and each of the second audio fingerprints included in the predetermined fingerprint database includes:

for each first two-tuple and each reference two-tuple, detecting whether the first hash code of the first two-tuple is the same as the second hash code of the reference two-tuple;

in response to the first hash code of the first two-tuple being the same as the second hash code of the reference two-tuple, calculating a first difference between the first acquisition time of the first two-tuple and the second acquisition time of the reference two-tuple;

calculating a cumulative number based on at least information associated with the first difference between the first acquisition time of the first two-tuple and the second acquisition time of the reference two-tuple; and determining a maximum cumulative number based on at least information associated with the cumulative numbers related to the first audio fingerprint and the second audio fingerprints as the matching degree of the first audio fingerprint and each of the second audio fingerprints.

2. The method of claim 1, further comprising:
acquiring the second audio signal for a predetermined duration from the program, wherein the predetermined duration is denoted as ΔT and the end of the predetermined duration corresponds to a current time T;
calculating the second audio fingerprint based on at least information associated with the second audio signal; and
storing the second audio fingerprint and a mapping between the second audio fingerprint and the program into the audio fingerprint database;
wherein the calculating the second audio fingerprint based on the second audio signal includes:
extracting one or more second peak points from the second audio signal;
for each second peak point, acquiring a second acquisition time and a second acquisition frequency of the second peak point;
acquiring a matching time and a matching frequency of a third peak point matching with the second peak point within a predetermined range;
calculating a second difference between the second acquisition time and the matching time and a frequency difference between the second acquisition frequency and the matching frequency;
calculating a hash value based on at least information associated with the second acquisition frequency, the second difference and the frequency difference;
determining the hash value as a hash code corresponding to the second peak point;
storing the second acquisition time and the hash code corresponding to the second peak point as a reference two-tuple; and
providing the reference two-tuple as a second audio fingerprint.

3. The method of claim 1 wherein the first audio signal is associated with a terminal environment, and the second audio signal is associated with a live program.

4. An apparatus for program identification, the apparatus comprising:
an acquisition module configured to acquire a first audio fingerprint corresponding to a first audio signal;
a detection module configured to detect whether one or more second audio fingerprints in a predetermined fingerprint database match with the first audio fingerprint, the one or more second audio fingerprints corresponding to a second audio signal associated with a program; and
an identification module configured to, in response to one of the second audio fingerprints matching with the first audio fingerprint, provide the program associated with the matching second audio signal as a result for program identification associated with the first audio signal;
wherein the detection module comprises:
a first calculation unit configured to calculate a matching degree between the first audio fingerprint and each of the second audio fingerprints included in the predetermined fingerprint database;
a first determination unit configured to determine one of the second audio fingerprints having a maximum matching degree with the first audio fingerprint;
a detection unit configured to detect whether the maximum matching degree exceeds a predetermined threshold; and
a second determination unit configured, to in response to the maximum matching degree exceeding the predetermined threshold, provide the one of the second audio fingerprints having the maximum matching degree as matching with the first audio fingerprint;
wherein:
the first audio signal includes one or more first peak points;
the first audio fingerprint corresponding to the first audio signal includes one or more first two-tuples, a first two-tuple including a first acquisition time of a first peak point and a first hash code corresponding to the first peak point;
the second audio signal includes one or more second peak points;
one of the second audio fingerprints corresponding to the second audio signal includes one or more reference two-tuples, a reference two-tuple including a second acquisition time of a second peak point and a second hash code corresponding to the second peak point; and
the first calculation unit includes:
a detection subunit configured to detect, for each first two-tuple and each reference two-tuple, whether the first hash code of the first two-tuple is the same as the second hash code of the reference two-tuple;
a first calculation subunit configured to, in response to the first hash code of the first two-tuple being the same as the second hash code of the reference two-tuple, calculate a first difference between the first acquisition time of the first two-tuple and the second acquisition time of the reference two-tuple;
a second calculation subunit configured to calculate a cumulative number based on at least information associated with the first difference between the first acquisition time of the first two-tuple and the second acquisition time of the reference two-tuple; and
a first determination subunit configured to determine a maximum cumulative number based on at least information associated with the cumulative numbers related to the first audio fingerprint and the second audio fingerprints as the matching degree of the first audio fingerprint and each of the second audio fingerprints.

5. The apparatus of claim 4 wherein the detection module further comprises:
an acquisition unit configured to acquire the second audio signal for a predetermined duration from the program, wherein the predetermined duration is denoted as ΔT and the end of the predetermined duration corresponds to a current time T;
a second calculation unit configured to calculating the second audio fingerprint based on at least information associated with the second audio signal; and
a saving unit configured to store the second audio fingerprint and a mapping between the second audio fingerprint and the program into the audio fingerprint database;
wherein the second calculation unit includes:
a first acquisition subunit configured to extract one or more second peak points from the second audio signal, and for each second peak point, acquire a second acquisition time and a second acquisition frequency of the second peak point;
a second acquisition subunit configured to acquire a matching time and a matching frequency of a third peak point matching with the second peak point within a predetermined range;
a third calculation subunit configured to calculate a second difference between the second acquisition time and the matching time and a frequency difference between the second acquisition frequency and the matching frequency;

a fourth calculation subunit configured to calculate a hash value based on at least information associated with the second acquisition frequency, the second difference and the frequency difference, and determine the hash value as a hash code corresponding to the second peak point; and a second determination subunit configured to store the second acquisition time and the hash code corresponding to the second peak point as a reference two-tuple, and provide the reference two-tuple as a second audio fingerprint.

6. The apparatus of claim 4 wherein the first audio signal is associated with a terminal environment and the second audio signal is associated with a live program.

7. The apparatus of claim 4, further comprising:
one or more data processors; and
a computer-readable storage medium;
wherein one or more of the acquisition module, the detection module, the identification module are stored in the storage medium and configured to be executed by the one or more data processors.

8. A non-transitory computer readable storage medium comprising programming instructions for program identification, the programming instructions configured to cause one or more data processors to execute operations comprising:
acquiring a first audio fingerprint corresponding to a first audio signal;
detecting whether one or more second audio fingerprints in a predetermined fingerprint database match with the first audio fingerprint, the one or more second audio fingerprints corresponding to a second audio signal; and
in response to one of the second audio fingerprints matching with the first audio fingerprint, providing a program associated with the matching second audio signal as a result for program identification associated with the first audio signal;
wherein the detecting whether one or more second audio fingerprints in a predetermined fingerprint database match with the first audio fingerprint includes:
calculating a matching degree between the first audio fingerprint and each of the second audio fingerprints included in the predetermined fingerprint database;
determining one of the second audio fingerprints having a maximum matching degree with the first audio fingerprint;
detecting whether the maximum matching degree exceeds a predetermined threshold; and
in response to the maximum matching degree exceeding the predetermined threshold, providing the one of the second audio fingerprints having the maximum matching degree as matching with the first audio fingerprint;
wherein:
the first audio signal includes one or more first peak points;
the first audio fingerprint corresponding to the first audio signal includes one or more first two-tuples, a first two-tuple including a first acquisition time of a first peak point and a first hash code corresponding to the first peak point;
the second audio signal includes one or more second peak points;
one of the second audio fingerprints corresponding to the second audio signal includes one or more reference two-tuples, a reference two-tuple including a second acquisition time of a second peak point and a second hash code corresponding to the second peak point;
the calculating a matching degree between the first audio fingerprint and each of the second audio fingerprints included in the predetermined fingerprint database includes:
for each first two-tuple and each reference two-tuple, detecting whether the first hash code of the first two-tuple is the same as the second hash code of the reference two-tuple;
in response to the first hash code of the first two-tuple being the same as the second hash code of the reference two-tuple, calculating a first difference between the first acquisition time of the first two-tuple and the second acquisition time of the reference two-tuple;
calculating a cumulative number based on at least information associated with the first difference between the first acquisition time of the first two-tuple and the second acquisition time of the reference two-tuple; and
determining a maximum cumulative number based on at least information associated with the cumulative numbers related to the first audio fingerprint and the second audio fingerprints as the matching degree of the first audio fingerprint and each of the second audio fingerprints.

9. The storage medium of claim 8 wherein the programming instructions are configured to cause one or more data processors to execute further operations including:
acquiring the second audio signal for a predetermined duration from the program, wherein the predetermined duration is denoted as ΔT and the end of the predetermined duration corresponds to a current time T;
calculating the second audio fingerprint based on at least information associated with the second audio signal; and
storing the second audio fingerprint and a mapping between the second audio fingerprint and the program into the audio fingerprint database;
wherein the calculating the second audio fingerprint based on the second audio signal includes:
extracting one or more second peak points from the second audio signal;
for each second peak point, acquiring a second acquisition time and a second acquisition frequency of the second peak point;
acquiring a matching time and a matching frequency of a third peak point matching with the second peak point within a predetermined range;
calculating a second difference between the second acquisition time and the matching time and a frequency difference between the second acquisition frequency and the matching frequency;
calculating a hash value based on at least information associated with the second acquisition frequency, the second difference and the frequency difference;
determining the hash value as a hash code corresponding to the second peak point;
storing the second acquisition time and the hash code corresponding to the second peak point as a reference two-tuple; and
providing the reference two-tuple as a second audio fingerprint.

10. The storage medium of claim 8 wherein the first audio signal is associated with a terminal environment, and the second audio signal is associated with a live program.

\* \* \* \* \*